No. 733,353. PATENTED JULY 7, 1903.
E. BULL.
TOY.
APPLICATION FILED FEB. 27, 1902.
NO MODEL. 2 SHEETS—SHEET 1.

Witnesses:-
Geor. Beeners.
Charles H. Briggs.

Inventor:-
Einar Bull
Per. E. Eaton.
His Attorney.

No. 733,353. PATENTED JULY 7, 1903.
E. BULL.
TOY.
APPLICATION FILED FEB. 27, 1902.
NO MODEL. 2 SHEETS—SHEET 2.
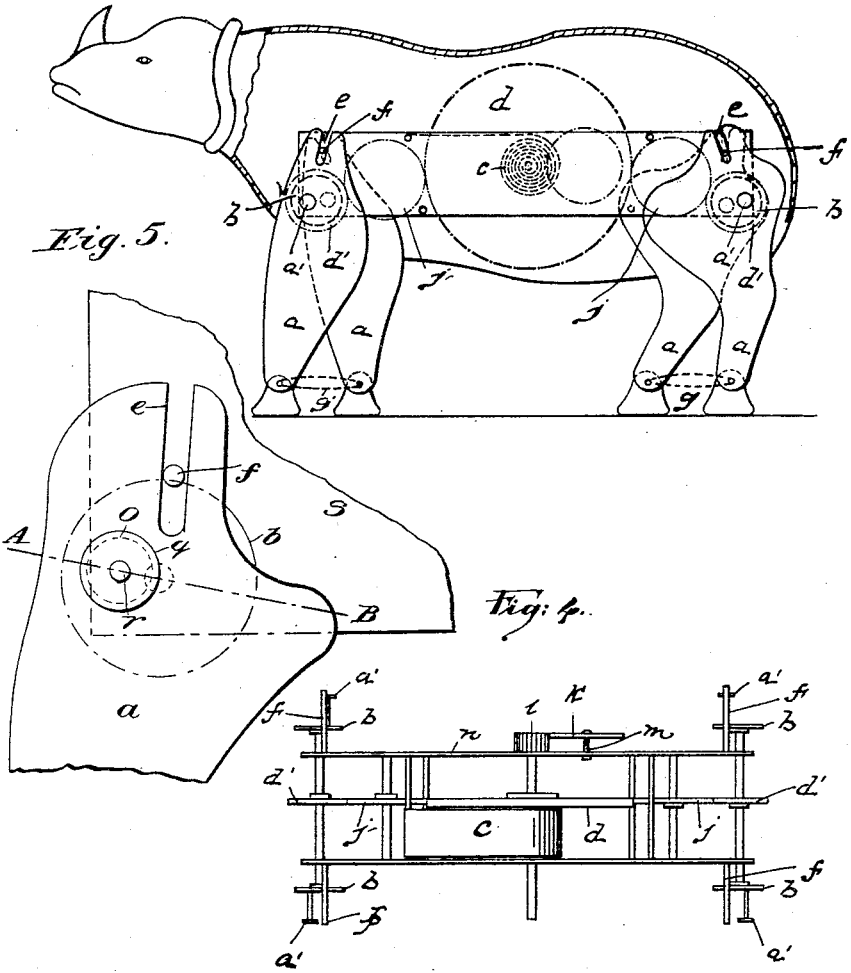
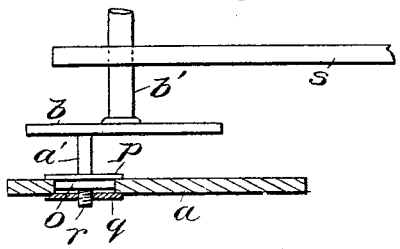
Witnesses:
Leon Beeney.
Charles H. Briggs.
Inventor:
Einar Bull.
Per: E. Eaton.
His Attorney.

No. 733,353. Patented July 7, 1903.

UNITED STATES PATENT OFFICE.

EINAR BULL, OF GLASGOW, SCOTLAND.

TOY.

SPECIFICATION forming part of Letters Patent No. 733,353, dated July 7, 1903.

Application filed February 27, 1902. Serial No. 95,847. (No model.)

*To all whom it may concern:*

Be it known that I, EINAR BULL, a subject of the King of Sweden and Norway, and a resident of Glasgow, in the county of Lanark, Scotland, have invented certain new and useful Improvements in Toys, of which the following is a full, clear, and exact specification thereof.

This invention relates to improvements in mechanical toys in which the mechanism is employed to operate the limbs of animals, so as to imitate their natural motions.

Figure 1:
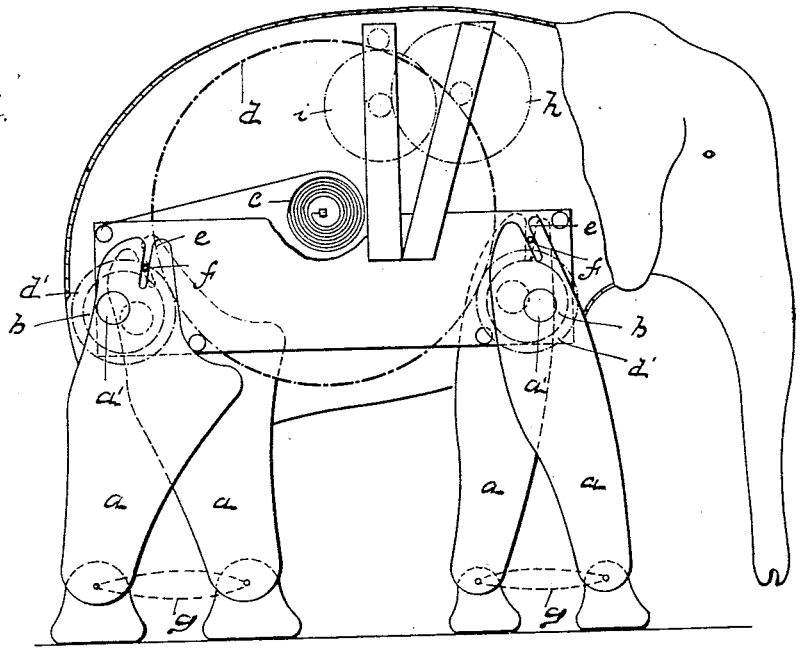
Figure 2:
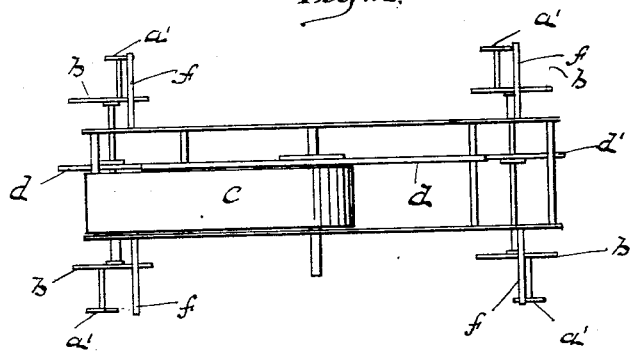

Referring to the annexed drawings, Figure 1 is a sectional side elevation of the figure of an animal constructed and operated according to my invention; Fig. 2, a plan view of mechanism removed; Fig. 3, a sectional side elevation of modified form of mechanism adapted to the different shape of the figure of the animal; Fig. 4, a plan view of mechanism removed; Fig. 5, an enlarged detail view showing the arrangement of attaching the animal's limbs to the body of the figure; Fig. 6, a sectional plan view of same through line A B, Fig. 5.

The limbs $a$ are carried by the cranks $a'$, attached to and at the desired distance from the center of the disks or wheels $b$, which are in turn carried by the main spindles $b'$, and operated through the medium of the spring $c$ and wheel $d$. The particular method of attaching the limbs $a$ to the body of the animal is shown in Figs. 5 and 6. The end of each crank $a'$ is provided with a circular disk $o$, provided with a flange $p$, as shown, this circular disk $o$ being free to revolve within a circular hole provided at the upper end of each limb $a$. An outer disk $q$, slightly larger than the disk $o$ aforesaid, is screwed onto the projection $r$, thus preventing the limbs disengaging from their respective cranks. The upper end of each limb is also provided with a slot $e$, which engages with a pin $f$, carried by the framing $s$, the action of these pins and slots, together with the circular motion of the cranks $a'$, causing the limbs to reciprocate, the feet of same traveling along curves indicated by the dotted lines $g$. The relative positions of the limbs to each other are such that the aforesaid movements give a natural walking effect to the animal.

The wheels $h$ and $i$, Fig. 1, are merely employed to check the motion of the spring $c$.

In Fig. 3 owing to the shape of the figure it is necessary to employ the intermediate wheels $j$ and $j'$, and in the figure a modified form of spring control is shown, consisting of the spur-wheel $k$, gearing with the pinion $l$ operated by the spring $c$, the wheel $k$ being mounted on a screw $m$, so that when wound up the wheel $k$ will bear against the plate $n$ and so by the friction thereon will control the spring $c$.

Any well-known form of controlling the spring may be employed in substitution of the above-described method, and I do not bind myself to this.

Having thus described my invention, what I claim, and desire to secure by Letters Patent, is—

In mechanical toys of the class herein described, pivoted portions or limbs having circular holes in the upper end thereof, cranks operated by clockwork mechanism, circular flanged disks rigidly attached to the ends of said cranks and adapted to revolve within the circular holes aforesaid, screwed projections carried by the circular flanged disks aforesaid, disks adapted to screw onto said screwed projections for the purpose of holding the limbs in position, slots in the upper portion of said limbs, pins rigidly attached to the figure and adapted to engage in said slots, all in combination, substantially as described and illustrated herein.

In testimony that I claim the foregoing I have hereunto set my hand this 17th day of January, 1902.

EINAR BULL.

Witnesses:
J. W. MACALISTER,
JOHN RITCHIE.